Patented Sept. 21, 1937

2,093,488

UNITED STATES PATENT OFFICE 2,093,488

WATER VARNISH HAVING AN ENAMEL SURFACE AND INSOLUBLE AFTER DRYING

Fernand Frédéric Schwartz, Paris, France, assignor to Cela Holding S. A., Luxemburg, Luxemburg, a corporation No Drawing. Application August 31, 1935, Serial No. 38,850. Renewed July 12, 1937. In France April 28, 1933

10 Claims. (Cl. 134—79)

This invention relates to a water varnish which, after drying, has a transparent enamel surface of very pronounced crystalline brilliancy and which is insoluble.

The present application is a continuation in part of my application Ser. No. 716,005, filed March 16, 1934.

Up to the time of the present invention, brilliant and insoluble varnishes, such as are suitable for automobile bodies, airplanes and the like, have been of the nitrocellulose or oil varnish types. A water varnish which, after drying, had a brilliant surface and was insoluble had not been known prior to my invention, so far as I am aware.

I have discovered that a water varnish which, after drying, has a brilliant surface and is insoluble may be made by mixing in an aqueous ammoniacal solution a resinous material, a higher fatty acid which may or may not have been previously saponified, a metallic compound which forms a metallic complex with ammonia and forms a metallic resin soap and cellulose and/or methyl-cellulose. Among the resinous materials which I may employ are white resin, Manilla copal, sandarac resin, gum-lac, resinic ester with a weak acid, or other analogous bodies. The term "resinous material" is used herein to include not only true resins, but also gums. I may use any of the higher fatty acids which are saponifiable, preferably ricinoleic acid, linoleic acid or margaric acid. The metals which may be employed are those whose compounds form metallic complexes with ammonia and form metallic resin soaps with the resin soaps formed by the reaction of the resinous material with the higher fatty acid in the presence of ammonia. Such metals are zinc, nickel, cobalt, antimony, cadmium and tin. All of these metals have the property of forming with ammonia a metallic complex of the general formula Bivalent metal.$(NH_3)_4$.bivalent acid radical.

An example of such general formula is zinc ammonium carbonate $(Zn.(NH_3)_4.CO_3)$.

Aqueous ammoniacal solutions of the materials above referred to are stable, that is, they do not form precipitates even when kept for a long time in closed containers, but have the property of forming brilliant and insoluble coatings upon drying.

As examples illustrating the manner in which my water varnish may be prepared, the following are cited:

Example I

A resin, such, for example, as sandarac resin, is pulverized and then treated in a mixer provided with a heating system with a solution of ammoniacal soap and water. The ammoniacal soap employed may be the ricinolate, linoleate or margarate of ammonia. The ammoniacal soap reacts with the resin to produce a resin soap. To the resin soap thus produced is added an ammoniacal metallic complex. Such complex may be formed by dissolving the metallic hydroxide or carbonate of one of the previously mentioned metals in ammonia. The addition of the metallic complex results in the formation of a metallic resin soap. There is then added to the metallic resin soap a solution of cellulose or methyl-cellulose. The cellulose may be employed in the form of Schweitzer liquor.

The product thus obtained is perfectly stable. It may be diluted with water without forming any precipitate. Upon drying, the loss of water and ammonia causes the metal to combine with the resin and fatty acid, forming a metallic resin soap. Likewise, upon drying, the cellulose or methyl-cellulose reacts upon the metallic resin soap to leave an organo-metallic complex which is insoluble in water, is transparent and brilliant. The film of varnish becomes very hard and adheres perfectly upon a surface to which it is applied.

Example II (a) As example of production of cellulose solution, a paper paste having pure cellulose as basis is macerated and dissolved in an ammoniacal solution of copper carbonate until a complete dissolution is produced; the relative proportions of the bodies employed may be those which are commonly employed in the manufacture of the well-known Schweitzer's liquor. The solution thus obtained is intended to be mixed with the resins, in a quantity which is sufficient to correspond to the quantity of resin soap employed.

(b) A resin soap solution is formed by dissolving 20 kg. of sandarac resin in an ammoniacal water obtained by mixing 80 kg. water, 10 kg. ammonia and 3 kg. ricinoleic acid.

(c) Zinc carbonate is prepared by adding 6 kg. of sodium carbonate to a solution of 15 kg. of zinc sulphate in water. The precipitated zinc carbonate is then filtered, washed and dissolved in 30 kg. of ammonia in the presence of 10 kg. ricinoleic acid to form an ammoniacal zinc complex.

The final product is obtained by intimately mixing together: cupro-ammoniacal cellulose solution (a), resin solution (b), ammoniacal zinc complex (c).

The invention may be carried out by other methods than those particularly described. The varnish may be made in various ways so long as there is mixed together in aqueous ammoniacal solution a resinous material, a higher fatty acid, a metallic compound which forms a metallic complex with ammonia and forms a metallic resin soap, and cellulose or methyl-cellulose.

Cellulose and/or methyl-cellulose as suitable organic materials for use in my water varnish are specifically claimed in this application. Broader claims covering these and other organic materials are contained in a separate application.

Althouh I have given two examples of the manner in which the invention may be practiced, it is to be understood that the invention may be otherwise embodied or practiced within the scope of the following claims.

What I claim is:

1. A varnish comprising the reaction product of an ammoniacal aqueous solution containing:— a resinous material, a higher fatty acid, a metallic compound which forms a metallic complex with ammonia and forms a metallic resin soap, and a material of the class consisting of cellulose and methyl-cellulose which reacts upon the metallic resin soap to leave upon drying an organo-metallic complex which is insoluble in water.

2. A varnish comprising the reaction product of an ammoniacal aqueous solution containing:— a resinous material, a higher fatty acid, a compound of a metal of the group consisting of zinc, nickel, cobalt, antimony, cadmium and tin which forms a metallic complex with ammonia and forms a metallic resin soap, and a material of the class consisting of cellulose and methyl-cellulose which reacts upon the metallic resin soap to leave upon drying an organo-metallic complex which is insoluble in water.

3. A varnish comprising the reaction product of an ammoniacal aqueous solution containing:— a resinous material, a higher fatty acid, a zinc compound which forms a zinc complex with ammonia and forms zinc resin soap, and a material of the class consisting of cellulose and methyl-cellulose, the zinc resin soap having the property of reacting upon the cellulose or methyl-cellulose to leave upon drying an organo-zinc complex which is insoluble in water.

4. A varnish comprising the reaction product of an ammoniacal aqueous solution containing:— a resinous material, a saponified higher fatty acid, a metallic compound which forms a metallic complex with ammonia and forms a metallic resin soap, and a material of the class consisting of cellulose and methyl-cellulose which reacts upon the metallic resin soap to leave upon drying an organo-metallic complex which is insoluble in water.

5. The process of making a varnish, which comprises mixing in an aqueous ammoniacal solution a resinous material, a higher fatty acid, a metallic compound which forms a metallic complex with ammonia and forms a metallic resin soap, and a material of the class consisting of cellulose and methyl-cellulose and having the property of reacting upon the metallic resin soap, to leave upon drying an organo-metallic complex which is insoluble in water.

6. The process of making a varnish, which comprises mixing with a resin metallic soap in aqueous ammoniacal solution in the presence of a higher fatty acid a solution of a material of the class consisting of cellulose and methyl-cellulose which reacts upon the metallic resin soap to leave upon drying an organo-metallic complex which is insoluble in water.

7. The process of making a varnish, which comprises mixing with a resin metallic soap in aqueous ammoniacal solution in the presence of a saponified higher fatty acid a solution of a material of the class consisting of cellulose and methyl-cellulose which reacts upon the metallic resin soap to leave upon drying an organo-metallic complex which is insoluble in water.

8. The process of making a varnish, which comprises mixing in the presence of a higher fatty acid an ammoniacal solution of resinous material obtained by dissolving resinous material in a solution of ammoniacal soap, an ammoniacal metallic complex solution which reacts upon the resinous material to form a resin metallic soap, and an aqueous solution of a material of the class consisting of cellulose and methyl-cellulose.

9. The process of making a varnish, which comprises mixing together in the presence of a higher fatty acid an ammoniacal solution of resinous material, an ammoniacal metallic complex solution which reacts upon the resinous material and higher fatty acid to form a resin metallic soap, and an aqueous solution of a material of the class consisting of cellulose and methyl-cellulose which reacts upon metallic resin soap to leave upon drying an organo-metallic complex which is insoluble in water.

10. The process of making a varnish, which comprises mixing together in the presence of a previously saponified higher fatty acid an ammoniacal solution of resinous material, an ammoniacal metallic complex solution which reacts upon the resinous material and saponified higher fatty acid to form a resin metallic soap, and an aqueous solution of a material of the class consisting of cellulose and methyl-cellulose which reacts upon metallic resin soap to leave upon drying an organo-metallic complex which is insoluble in water.

FERNAND FRÉDÉRIC SCHWARTZ.